United States Patent
Lei et al.

(10) Patent No.: US 7,711,003 B2
(45) Date of Patent: May 4, 2010

(54) METHOD FOR REDUCING SERVICE LOSS IN INTERWORKING BETWEEN SS7 SIGNALING NETWORK AND M3UA, AND A SIGNALING GATEWAY

(75) Inventors: Zhuohui Lei, Shenzhen (CN); Miansheng Ma, Shenzhen (CN); Yuhong Liu, Shenzhen (CN); Nengyi Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 11/901,972

(22) Filed: Sep. 19, 2007

(65) Prior Publication Data

US 2008/0063008 A1    Mar. 13, 2008

Related U.S. Application Data

(63) Continuation of application No. PCT/CN2006/001308, filed on Jun. 13, 2006.

(30) Foreign Application Priority Data

Nov. 4, 2005    (CN) ................ 2005 1 0115535

(51) Int. Cl.
*H04J 3/14* (2006.01)
(52) U.S. Cl. ................ 370/467; 370/401
(58) Field of Classification Search ........ 370/401, 370/236, 241, 242, 244, 252, 216, 467
See application file for complete search history.

(56) References Cited

U.S. PATENT DOCUMENTS 7,046,684 B2 *   5/2006   Matsuura .......... 370/401

(Continued)

FOREIGN PATENT DOCUMENTS

| CN | 1378368   | 11/2002 |
|----|-----------|---------|
| CN | 1545343   | 11/2004 |
| EP | 1 246 477 | 10/2002 |

OTHER PUBLICATIONS

Morneault, K., et al. "Signaling System 7 (SS7) Message Transfer Part 3 (MTP3)—User Adaptation Layer (M3UA)." IETF Draft (2005) p. 16.

(Continued)

*Primary Examiner*—Brian D Nguyen
(74) *Attorney, Agent, or Firm*—Finnegan, Henderson, Farabow, Garrett & Dunner LLP

(57) ABSTRACT

The invention discloses a method for reducing service loss in interworking between SS7 signaling network and M3UA. In the method, when state of an M3UA ASP-related signaling point changes, the SS7 signaling network may be notified by using messages defined in existing protocols or other messages. Thus, when performing service interworking with M3UA, the SS7 signaling network determines whether service interaction may be performed with M3UA in accordance with the state of current ASP-related signaling point. If the current ASP-related signaling point is unavailable, the SS7 signaling network will not perform service interaction. As a result, the service loss in interworking between SS7 signaling network and M3UA may be reduced without any affect on the normal service interworking between SS7 signaling network and M3UA. In addition, the method may conform to existing protocol standards, and implemented in a simple and easy way.

19 Claims, 3 Drawing Sheets

U.S. PATENT DOCUMENTS

2003/0108067 A1    6/2003  Craig et al.
2004/0264671 A1*  12/2004  Lamberton et al. ..... 379/221.03
2005/0063371 A1*   3/2005  Nealon ....................... 370/373
2006/0034258 A1*   2/2006  Bouckaert et al. ........... 370/352
2006/0064475 A1*   3/2006  Angermayr et al. ......... 709/220

OTHER PUBLICATIONS

English abstract of CN 1378368 dated Nov. 6, 2004.
English abstract of CN 1545343 dated Nov. 10, 2004.

* cited by examiner

METHOD FOR REDUCING SERVICE LOSS IN INTERWORKING BETWEEN SS7 SIGNALING NETWORK AND M3UA, AND A SIGNALING GATEWAY

This application is a continuation of International Application No. CT/CN2006/001308, filed Jun. 13, 2006. International Application No. PCT/CN2006/001308 claims the priority of Chinese patent application No. 200510115535.4 submitted with the State Intellectual Property Office of P.R.C. on Nov. 4, 2005, entitled "Method for Reducing Service loss in Interworking between SS7 Signaling Network and M3UA", the content of which is incorporated in entirety herein by reference.

FIELD OF THE INVENTION

The present invention relates to the field of network communication technology, and particularly, to a method for reducing the service loss in interworking between Signaling System 7 (SS7) signaling network and Message Transfer Part 3 User Adaptation Layer (M3UA).

BACKGROUND OF THE INVENTION

Signaling systems are critical to the modern communication networks. The good performance of a telecommunication networks depends on the reliable transmission of signaling messages through the telecommunication equipment. A series of specifications and techniques, such as the matured narrow-band No. 7 signaling system, have been introduced in the conventional telecommunication networks to ensure the reliability of a signaling system.

With the gradual maturity of the Internet Protocol (IP) packet-based network technology, it becomes possible to utilize the IP packet-based network to transmit services such as voice service, data service, and multimedia service, etc. This requires combining the IP packet-based network with the conventional circuit switched network for service transmission. In order to achieve the interworking between the conventional circuit switched network and the IP packet-based network, a set of Signaling Transport (SIGTRAN) protocols was constituted by the Internet Engineering Task Force (IETF) for transmitting the signaling of the conventional circuit switched network over the IP network. The MTP3 User Adaptation Layer (M3UA) protocol is a protocol in the set of the SIGTRAN protocols for adaptation of the interface primitive between the Message Transfer Part 3 (MTP3) layer and the upper layer users of the MTP3 layer. M3UA is designed to enable the transparent transmission of messages between the MTP3 (Message Transfer Part 3) and the upper layer users of the MTP3 layer.

The M3UA protocol is used for interworking between SS7 signaling and IP network as well as the transmission of MTP3 user messages over the IP network. The basic application model of the M3UA protocol is as shown in FIG. 1. From the viewpoint of the Telephone User Part (TUP)/ISDN User Part (ISUP)/Signaling Connection Control Part (SCCP) (TUP/ISUP/SCCP . . . ), the Message Transfer Part (MTP) is only a channel for message transmission, i.e., the Message Transfer Part (MTP) is used to ensure the reliable and accurate transmission of user part messages to the user part of the destination signaling point (SP). The MTP includes 3 parts, i.e., Message Transfer Part 1 (MTP1), Message Transfer Part 2 (MTP2), and Message Transfer Part 3 (MTP3). While the M3UA is used for implement user adaptation function of the MTP3.

In the M3UA protocol, several SS7 signaling network management messages are specified as follows:

Destination Unavailable (DUNA): when a related signaling point of an SS7 signaling network has a failure and thus becomes unavailable, the M3UA of the Signaling Gateway (SG) will send the DUNA message to notify the relevant Application Server Process(es) (ASP(s));

Destination Available (DAVA): when a related signaling point of an SS7 signaling network recovers from a failure and thus becomes available, the M3UA of the SG will send the DAVA message to notify the relevant ASP(s);

Destination State Audit (DAUD): this message is used for the ASPs to audit the state of a related signaling point of the related SS7 signaling network to the SG;

Signaling Congestion (SCON): when a related signaling point of the SS7 signaling network is congested, the M3UA of the SG will send the SCON message to notify the relevant ASP(s);

Destination User Part Unavailable (DUPU): when the MTP user part of a related signaling point of the SS7 signaling network becomes unavailable, the M3UA of the SG will send the DUPU message to notify the relevant ASP(s).

As described above, in the specification for SS7 signaling network management messages in M3UA protocol, it is specified explicitly that the signaling gateway (SG) should use the corresponding SS7 signaling network management messages in the M3UA to notify the relevant ASPs whenever the state of a signaling point in SS7 signaling network changes.

FIG. 2 is a schematic diagram showing the application of the SS7 signaling network management messages in M3UA. As shown in FIG. 2, whenever the state of an SS7 signaling point "A" changes, the relevant SS7 Signaling Transfer Point (STP) will notify the SG by using the SS7 MTP3 signaling network management messages, such as Transfer Prohibit (TFP)/Transfer Allowed (TFA)/Transfer Congestion (TFC)/User Part Unavailable (UPU). Then, the SG notifies the relevant ASPs by using the M3UA SS7 signaling network management messages, such as DUNA/DAVA/SCON/DUPU. In this way, the ASPs may learn about the state of the relevant signaling points in the SS7 signaling network quickly. However, though the M3UA protocol specifies explicitly the SS7 signaling network management messages and the corresponding processing schemes as described above, the relevant SS7 signaling points can not learn about the change in the states of the signaling points at the ASP side of M3UA when the states of the signaling points at the ASP side changes, because the M3UA does not notify the SS7 network of the change. Accordingly, an upper layer service user of the signaling points at SS7 side may not know the state change in the signaling points at the ASP side of M3UA, e.g., a failure in a signaling point at the ASP side of M3UA. This may result in a loss of service sent from an SS7 signaling point to the ASP side of M3UA, i.e., the loss of the relevant signaling services. Therefore, the reliability of communication can not be guaranteed.

SUMMARY OF THE INVENTION

The present invention provides a method for reducing service loss in interworking between Signaling System 7 (SS7) signaling network and Message Transfer Part 3 User Adaptation Layer (M3UA), which may effectively reduce the service loss from an SS7 signaling point to a signaling point at M3UA ASP side and ensure the reliability of communication.

The embodiments of the present invention provides the following technical solutions:

A method for reducing service loss in interworking between a Signaling System 7 (SS7) signaling network and Message Transfer Part 3 User Adaptation Layer (M3UA), includes: determining whether there is a state change of an M3UA signaling point, obtaining the content of the state change of the signaling point; and sending, by a signaling gateway (SG), a message indicating the state change of the M3UA signaling point to the SS7 signaling network in accordance with the content of state change of the M3UA signaling point.

When discovering the state change of the M3UA signaling point or when receiving a notification indicating the state change of the M3UA signaling point, M3UA of the SG determines that state of the M3UA signaling point has changed.

The notification indicating the state change of the M3UA signaling point may be a Destination Unavailable message, or a Destination Available message, or a Signaling Congestion message, or a Destination User Part Unavailable message.

the M3UA signaling point is an ASP-related signaling point, when M3UA of the SG discovers that the ASP-related signaling point has a failure, or when the M3UA of the SG receives a message indicating that the ASP-related signaling point is unavailable, the content of the state change of the signaling point is Application Server Process, ASP, related signaling point having a failure or being unavailable.

The M3UA signaling point is an ASP-related signaling point, when M3UA of the SG discovers that an ASP-related signaling point has recovered from a failure, or when the M3UA of the SG receives a message indicating that the ASP-related signaling point is available, the content of the state change of the signaling point is ASP-related signaling point being recovered from a failure or being available.

The M3UA signaling point is an ASP-related signaling point, when M3UA of the SG discovers that an ASP-related signaling point is congested, or when the M3UA of the SG receives a message indicating that the ASP-related signaling point is congested, the content of the state change of the signaling point is ASP-related signaling point being congested.

the M3UA signaling point is an ASP-related signaling point, when M3UA of the SG discovers that upper layer service user of an ASP-related signaling point has a failure, or when the M3UA of the SG receives a message indicating that the upper layer service user of the ASP-related signaling point is unavailable, the content of the state change of the signaling point is ASP-related signaling point upper layer user having a failure or being unavailable.

An SS7 signaling network management message indicating the state change of the M3UA signaling point may be sent by the SG to the SS7 signaling network, in accordance with the content of the state change of the M3UA signaling point.

the M3UA signaling point is an ASP-related signaling point, When the content of the state change of the signaling point is Application Server Process, ASP, related signaling point having a failure or being unavailable, the SG notifies the SS7 signaling network that the ASP-related signaling point is unavailable by using a Transfer Prohibit message of SS7 signaling network management messages.

the M3UA signaling point is an ASP-related signaling point, When the content of the state change of the signaling point is ASP-related signaling point being recovered from a failure or being available, the SG notifies the SS7 signaling network that the M3UA ASP-related signaling point is available by using a Transfer Allow message of SS7 signaling network management messages.

the M3UA signaling point is an ASP-related signaling point, When the content of the state change of the signaling point is ASP-related signaling point being congested, the SG notifies the SS7 signaling network that the M3UA ASP-related signaling point is congested by using a Transfer Congestion message of SS7 signaling network management messages.

the M3UA signaling point is an ASP-related signaling point, When the content of the state change of the signaling point is ASP-related signaling point upper layer user having a failure or being unavailable, the SG notifies the SS7 signaling network that the upper layer service user part of the M3UA ASP-related signaling point is unavailable by using a User Part Unavailable message of SS7 signaling network management messages.

A new message indicating the state change of the M3UA signaling point may be sent by the SG to the SS7 signaling network, in accordance with the content of the state change of the M3UA signaling point.

An embodiment of the invention provides a signaling gateway, which includes: means for determining whether there is a state change of a Message Transfer Part 3 User Adaptation Layer, M3UA, related signaling point, means for obtaining the content of the state change; and means for sending a message indicating the state change of the M3UA signaling point to the SS7 signaling network in accordance with the content of the state change of the M3UA signaling point.

As can be seen from the technical solution described above, the method according to the embodiments of the present invention may be applied in the next generation network (NGN). During this application, when the SS7 signaling gateway implements the interworking between SS7 signaling service and M3UA, the information that a signaling point at M3UA ASP side in IP domain has a failure or becomes congested may be notified to the SS7 signaling network in time. Therefore, the loss in transmission of SS7 signaling services due to the state change of the relevant signaling points at M3UA ASP side may be reduced as far as possible, and thereby the demand in actual networking applications may be satisfied better. Furthermore, the method according to the embodiments of the present invention may meet the demand in the SS7 networking applications and improve the reliability of the SS7 signaling network while being compatible to the protocol standards.

DETAILED DESCRIPTION OF THE EMBODIMENTS

An embodiment of the present invention provides a method for notifying a signaling point in an SS7 signaling network of the state change of a signaling point at the ASP side of M3UA (abbreviated as ASP-related signaling point) by using the messages defined for the existing protocols or other messages when the state of the ASP-related signaling point changes, so as to ensure that the SS7 signaling network will not perform service interaction with the ASP-related signaling point when the state of the ASP-related signaling point becomes unavailable or the state of the upper layer service user of the ASP-related signaling point becomes unavailable, while the SS7 signaling network will perform service interaction with the ASP-related signaling point when the state of the ASP-related signaling point becomes available or the state of the upper layer service user of the ASP-related signaling point becomes available. In this way, the service loss in interworking between SS7 signaling network and M3UA may be reduced in the case of the normal interworking between the SS7 signaling network and M3UA.

The implementation of the method for reducing the service loss in interworking between an SS7 signaling network and the M3UA according to an embodiment of the present invention will be described below with reference to the accompanying drawings.

Figure 3:
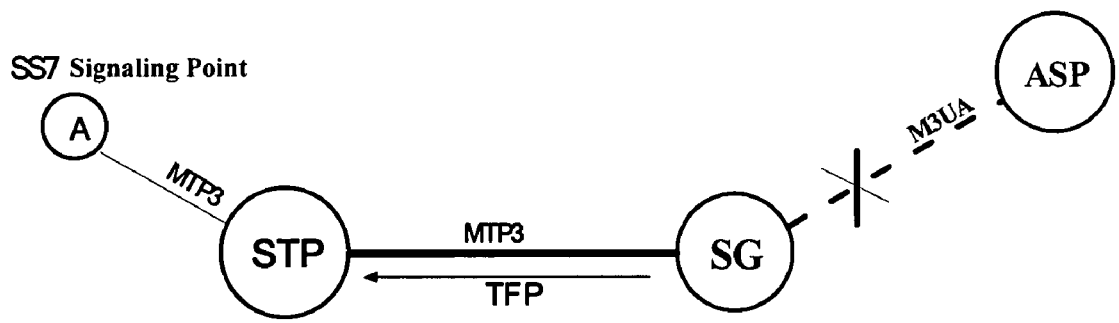
FIG. 3 is a schematic diagram showing the application of the SS7 signaling network management messages when an M3UA ASP signaling is unavailable according to an embodiment of the present invention.

FIG. 3 is a schematic diagram showing the application of the SS7 signaling network management messages when an M3UA ASP-related signaling point is unavailable according to an embodiment of the present invention. As shown in FIG. 3, upon discovering that a relevant ASP-related signaling point has a failure, or upon receiving a message (such as DUNA) indicating that the relevant ASP-related signaling point is unavailable, the M3UA of a signaling gateway SG should analyze the state change of the signaling points relevant to the ASP. If the states of the signaling points relevant to the ASP (M3UA signaling point management cluster, SPMC) change to "unavailable", the M3UA should notify the SG. The SG notifies the relevant signaling points in the SS7 signaling network that the ASP-related signaling point is unavailable by sending an SS7 signaling network management message "TFP".

Figure 4:
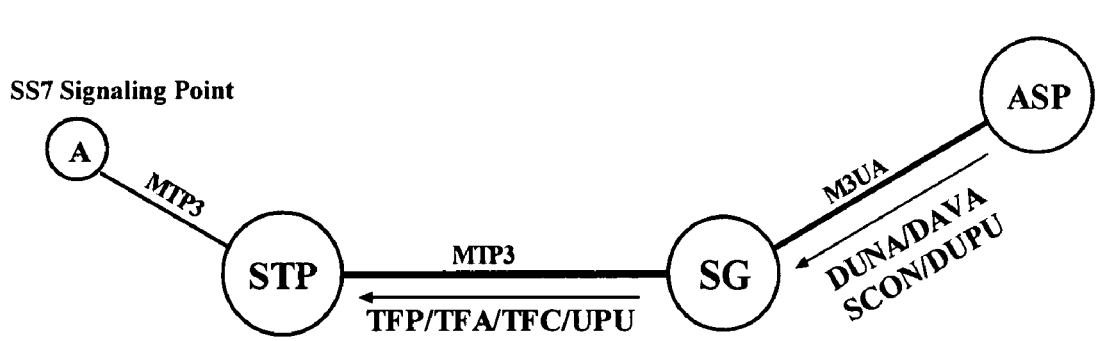
FIG. 4 is a schematic diagram showing the application of the SS7 signaling network management messages according to an embodiment of the present invention.

FIG. 4 is a schematic diagram showing the application of the SS7 signaling network management messages according to an embodiment of the present invention. As shown in FIG. 4, upon discovering a relevant ASP-related signaling point recovers from a failure, or upon receiving a message (such as DAVA) indicating that the relevant ASP-related signaling point becomes available, the M3UA of a signaling gateway SG will analyze the state change of the signaling points relevant to the ASP. If the states of the signaling points relevant to the ASP (M3UA signaling point management cluster, SPMC) change to "available", the M3UA will notify the SG. The SG in turn notifies the relevant signaling points in the SS7 signaling network that the ASP-related signaling point recovers and thus be available by sending an SS7 signaling network management message "TFA".

Upon discovering a relevant ASP-related signaling point is congested, or upon receiving a message (such as SCON) indicating that the relevant ASP-related signaling point is congested, the M3UA of the signaling gateway SG will analyze the state change of the signaling points relevant to the ASP. If the states of the signaling points relevant to the ASP (M3UA signaling point management cluster, SPMC) change to "congested", the M3UA will notify the SG. The SG in turn notifies the relevant signaling points in the SS7 signaling network that the ASP-related signaling point is congested by sending an SS7 signaling network management message "TFC".

When discovering the upper layer service user of a relevant ASP-related signaling point has a failure, or When receiving a message (such as DUPU) indicating that the upper layer service user of the relevant ASP-related signaling point is unavailable, the M3UA of the signaling gateway SG will analyze the state change of the upper layer service user of the ASP-related signaling points. If the state of an upper layer service user of the ASP-related signaling points relevant to the ASP changes to "unavailable", the M3UA will notify the SG. The SG in turn notifies the relevant signaling points in the SS7 signaling network that the upper layer service user of the ASP-related signaling points is unavailable by sending an SS7 signaling network management message "UPU".

Figure 5:
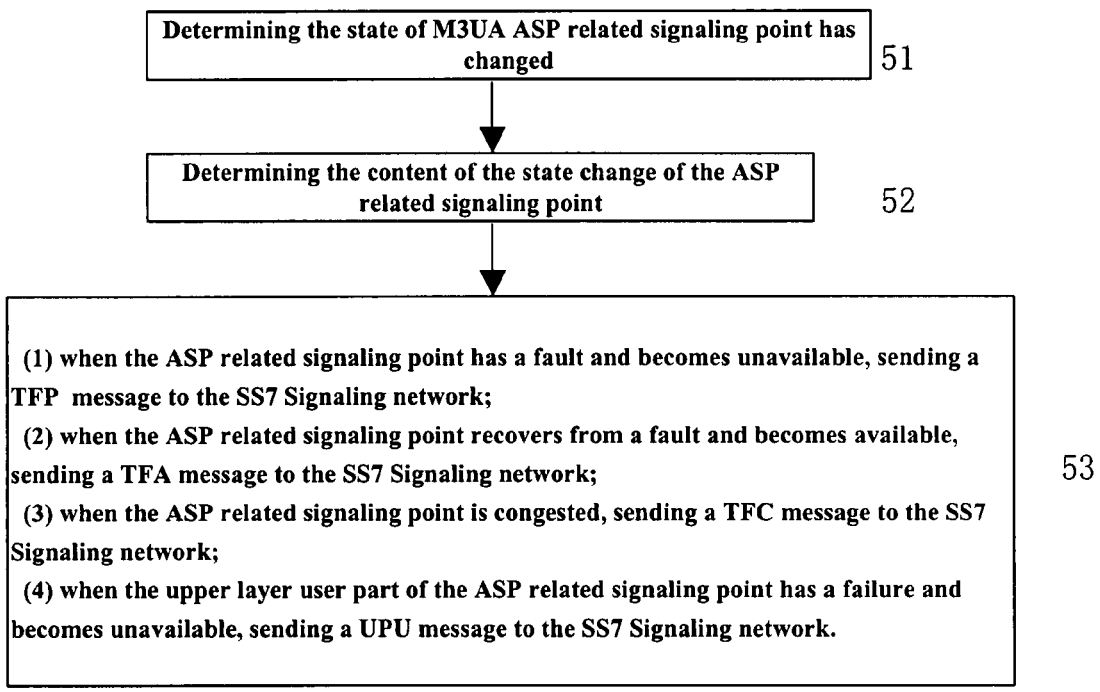
FIG. 5 is a processing flow diagram showing the method according to a preferred embodiment of the present invention.

FIG. 5 is a processing flow diagram of a method according to a preferred embodiment of the present invention. As shown in FIG. 5:

Step 51: it is determined whether the state of M3UA ASP-related signaling point has changed;

Usually, upon discovering a state change of an ASP-related signaling point, or upon receiving a notification indicating the state change of the ASP-related signaling point, the M3UA of a signaling gateway SG may determine that the state of the ASP-related signaling point has changed;

Step 52: the content of the state change of the ASP-related signaling point is analyzed and obtained, so as to determine the content of the message to be sent to the SS7 signaling network in accordance with the content information of the state change;

The content of the state change of the signaling point may include: the ASP-related signaling point having a failure or being unavailable, the ASP-related signaling point being recovered from a failure or being available, the ASP-related signaling point being congested, or the upper layer service user of the ASP-related signaling point having a failure or being unavailable;

Step 53: the SG notifies the SS7 signaling network of the event indicating the state change of the ASP-related signaling point by sending a corresponding message based on the content of the state change of the ASP-related signaling point, so as to ensure that the state change of the ASP-related signaling point may be known by the SS7 signaling network. Thus, the SS7 signaling network may perform service interworking with the M3UA in accordance with the states of ASP-related signaling points. As a result, the service loss due to the lack of knowledge of the states of the ASP-related signaling points may be avoided effectively.

Figure 1:
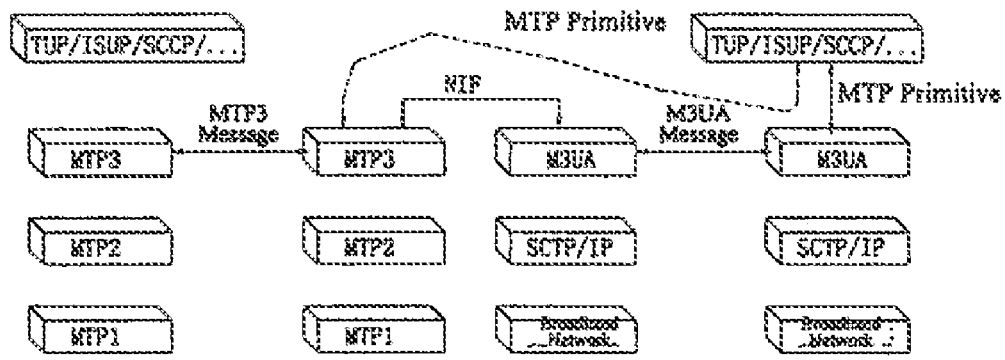
FIG. 1 is a schematic diagram showing the basic application model of the M3UA protocol in the prior art.
Figure 2:
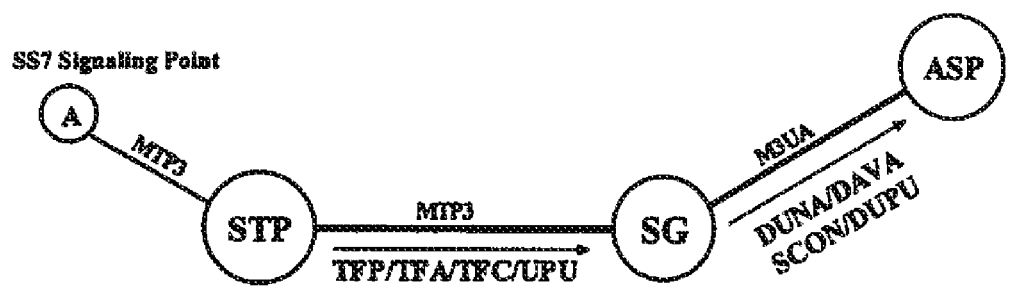
FIG. 2 is a schematic diagram showing the application of the SS7 signaling network management messages in M3UA in the prior art.

As shown in FIG. 2 and FIG. 4, in order to ensure the compatibility between the present invention and the existing network protocols, the event indicating the state change of an M3UA ASP-related signaling point may be sent to the SS7 signaling network by using the SS7 MTP3 signaling network management messages TFP/TFA/TFC/UPU correspondingly. For the different contents of the state changes of an ASP-related signaling point, the specific processing manner of sending a message to the SS7 signaling network may be as follows:

The M3UA of an SG analyzes the state of an ASP-related signaling point. When the state of the ASP-related signaling point becomes "unavailable", the M3UA will notify the SG. In this way, when the M3UA of the SG discovers that an ASP-related signaling point has a failure, or when the M3UA of the SG receives a message indicating that the ASP-related signaling point is unavailable, the SG will notify the SS7 signaling network that the ASP-related signaling point is unavailable by using the SS7 signaling network management message "TFP", that is, the SG will send a TFP message to the SS7 signaling network. Accordingly, the SS7 signaling network may know that the ASP-related signaling point is unavailable, and therefore will not perform service interaction with the ASP-related signaling point, so as to avoid the service loss in these cases.

Similarly, when the ASP-related signaling point that had a failure and was unavailable recovers from failure and becomes available, the M3UA will notify SG. In this way, when the M3UA of the SG discovers that the ASP-related signaling point has recovered, or when the M3UA of the SG receives a message indicating that the ASP-related signaling point is available, the SG will notify the SS7 signaling network that the ASP-related signaling point is available by using the SS7 signaling network management message TFA, that is, the SG will send an TFA message to the SS7 signaling network. Accordingly, the SS7 signaling network may perform service interaction with the ASP-related signaling point.

When the state of an ASP-related signaling point becomes "congested", the M3UA will notify the SG that the ASP-related signaling point is "congested". In this way, when the M3UA of the SG discovers that an ASP-related signaling point has become congested, or when the M3UA of the SG receives a message indicating that the ASP-related signaling point is congested, the SG will notify the SS7 signaling network that the ASP-related signaling point is congested by using the SS7 signaling network management message "TFC", that is, the SG will send a TFC message to the SS7 signaling network. Accordingly, the SS7 signaling network may know that the ASP-related signaling point is congested, and therefore may choose to perform or not perform service interaction with the ASP-related signaling point. Thus, the possibility of service loss may be reduced.

When the state of the upper layer service user of an ASP-related signaling point becomes "unavailable", the M3UA will also notify the SG. In this way, when the M3UA of the SG discovers that the upper layer service user of an ASP-related signaling point has a failure, or when the M3UA of the SG receives a message indicating that the upper layer service user of that ASP-related signaling point is unavailable, the SG will notify the SS7 signaling network that the upper layer user of the ASP-related signaling point is unavailable by using the SS7 signaling network management message "UPU", that is, the SG will send a UPU (User Part Unavailable) message to the SS7 signaling network. Accordingly, the SS7 signaling network will not perform service interaction with the upper layer service user of the ASP-related signaling point, so as to avoid the service loss in this case.

In another embodiment of the present invention, in the step 52, a newly created message may be used alternatively by the SG to notify the SS7 signaling network of state change of an M3UA ASP-related signaling point in accordance with the content of state change of the ASP-related signaling point. However, the use of a new message for notifying the state change of an ASP-related signaling point requires a greater modification to the existing network protocols, and thereby will result in an increased difficulty in implementation of the method according to the embodiments of the present invention. In consideration of this, the first implementation solution described above is more preferred. However, the protection scope of the present invention should not be limited unduly to the first implementation solution.

The method for reducing the service loss in interworking between an SS7 signaling network and the M3UA according to the embodiments of the present invention may be applied in the next generation network (NGN). In this application, when the SS7 signaling gateway implements the interworking between SS7 signaling service and M3UA, the information that a signaling point at M3UA ASP side in IP domain has a failure or becomes congested may be notified to the SS7 signaling network in time. Therefore, the loss in transmission of SS7 signaling services due to the state change of the relevant signaling points at M3UA ASP side may be reduced as far as possible, and thereby the demand in actual networking applications may be satisfied better. Furthermore, the method according to the embodiments of the present invention is implemented conforming to the protocol standards, thereby may further meet the demand in the SS7 networking applications and improve the reliability of the SS7 signaling network.

While the present invention has been illustrated and described with reference to some preferred embodiments, the present invention is not limited to these. Various variations and modifications recognized readily by those skilled in the art should be covered within the scope of the present invention as defined by the accompanying claims.

What is claimed is:

1. A method for reducing service loss in interworking between a Signaling System 7 (SS7) signaling network and an Internet Protocol (IP) domain of Message Transfer Part 3 User Adaptation Layer (M3UA), comprising:

determining, by a Signaling Gateway (SG), whether there is a state change of a M3UA signaling point, wherein the SG is coupled between the SS7 signaling network and the IP domain of M3UA;

analyzing and obtaining, by the SG, a content of the state change of the M3UA signaling point, wherein the content of the state change of the M3UA signaling point includes an Application Server Process (ASP)-related signaling point having a failure or being unavailable, the ASP-related signaling point being recovered from a failure or being available, the ASP-related signaling point being congested, or an upper layer service user of the ASP-related signaling point having a failure or being unavailable; and sending, by the SG, a message indicating the content of the state change of the M3UA signaling point to the SS7 signaling network in accordance with the content of the state change of the M3UA signaling point, to enable a SS7 signaling point of the SS7 signaling network to determine whether to perform service interaction with the ASP-related signaling point according to the message.

2. The method according to claim 1, wherein the determining whether there is a state change of the M3UA signaling point is performed when discovering the state change of the M3UA signaling point, or when receiving a notification indicating the content of the state change of the M3UA signaling point.

3. The method according to claim 2, wherein the notification indicating the content of the state change of the M3UA signaling point is a Destination Unavailable message, or a Destination Available message, or a Signaling Congestion message, or a Destination User Part Unavailable message.

4. The method according to claim 2, wherein the M3UA signaling point is an ASP-related signaling point, wherein
when M3UA of the SG discovers that the ASP-related signaling point has a failure, or when the M3UA of the SG receives a message indicating that the ASP-related signaling point is unavailable, the content of the state change of the signaling point is ASP-related signaling point having a failure or being unavailable.

5. The method according to claim 2, wherein the M3UA signaling point is an ASP-related signaling point, wherein
when M3UA of the SG discovers that an ASP-related signaling point has recovered from a failure, or when the M3UA of the SG receives a message indicating that the ASP-related signaling point is available, the content of the state change of the signaling point is ASP-related signaling point being recovered from a failure or being available.

6. The method according to claim 2, wherein the M3UA signaling point is an ASP-related signaling point, wherein
when M3UA of the SG discovers that an ASP-related signaling point is congested, or when the M3UA of the SG receives a message indicating that the ASP-related signaling point is congested, the content of the state change of the signaling point is ASP-related signaling point being congested.

7. The method according to claim 2, wherein the M3UA signaling point is an ASP-related signaling point, wherein
when M3UA of the SG discovers that an upper layer service user of an ASP-related signaling point has a failure, or when the M3UA of the SG receives a message indicating that the upper layer service user of the ASP-related signaling point is unavailable, the content of the state change of the signaling point is ASP-related signaling point upper layer user having a failure or being unavailable.

8. The method according to claim 1, wherein
an SS7 signaling network management message indicating the state change of the M3UA signaling point is sent by the SG to the SS7 signaling network, in accordance with the content of the state change of the M3UA signaling point.

9. The method according to claim 8, wherein the M3UA signaling point is an ASP-related signaling point, wherein
when the content of the state change of the signaling point is ASP-related signaling point having a failure or being unavailable, the SG notifies the SS7 signaling network that the ASP-related signaling point is unavailable by using a Transfer Prohibit message of SS7 signaling network management messages, to enable the SS7 signaling point of the SS7 signaling network not to perform service interaction with the ASP-related signaling point.

10. The method according to claim 8, wherein the M3UA signaling point is an ASP-related signaling point, wherein
when the content of the state change of the signaling point is ASP-related signaling point being recovered from a failure or being available, the SG notifies the SS7 signaling network that the ASP-related signaling point is available by using a Transfer Allow message of SS7 signaling network management messages, to enable the SS7 signaling point of the SS7 signaling network to perform service interaction with the ASP-related signaling point.

11. The method according to claim 8, wherein the M3UA signaling point is an ASP-related signaling point, wherein
when the content of the state change of the signaling point is ASP-related signaling point being congested, the SG notifies the SS7 signaling network that the ASP-related signaling point is congested by using a Transfer Congestion message of SS7 signaling network management messages, to enable the SS7 signaling point of the SS7 signaling network to choose performing or not performing service interaction with the ASP-related signaling point.

12. The method according to claim 8, wherein the M3UA signaling point is an ASP-related signaling point, wherein
when the content of the state change of the signaling point is ASP-related signaling point upper layer user having a failure or being unavailable, the SG notifies the SS7 signaling network that the upper layer service user part of the ASP-related signaling point is unavailable by using a User Part Unavailable message of SS7 signaling network management messages, to enable the SS7 signaling point of the SS7 signaling network not to perform service interaction with the upper layer service user of the ASP-related signaling point.

13. A signaling gateway coupled between a Signaling System 7 (SS7) signaling network and an Internet Protocol (IF) domain of Message Transfer Part 3 User Adaptation Layer (M3UA), comprising:
a unit for determining whether there is a state change of a M3UA signaling point;
a unit for analyzing and obtaining content of the state change of the M3UA signaling point, wherein the content of the state change of the M3UA signaling point includes an Application Server Process (ASP)-related signaling point having a failure or being unavailable, the ASP-related signaling point being recovered from a failure or being available, the ASP-related signaling point being congested, or an upper layer service user of the ASP-related signaling point having a failure or being unavailable; and
a unit for sending a message indicating the content of the state change of the M3UA signaling point to the SS7 signaling network in accordance with the content of the state change of the M3UA signaling point, to enable a SS7 signaling point of the SS7 signaling network to determine whether to perform service interaction with the ASP-related signaling point according to the message.

14. The signaling gateway according to claim 13, wherein the unit for determining whether there is a state change of the M3UA signaling point further comprises at least one of:
a unit for discovering the state change of the M3UA signaling point, or
a unit for receiving a notification indicating the content of the state change of the M3UA signaling point.

15. The signaling gateway according to claim 14, wherein the notification indicating the content of the state change of the M3UA signaling point is a Destination Unavailable message, or a Destination Available message, or a Signaling Congestion message, or a Destination User Part Unavailable message.

16. The signaling gateway according to claim 14, wherein the M3UA signaling point is an ASP-related signaling point, wherein
when the unit for discovering discovers that the ASP-related signaling point has a failure, or when the unit for receiving a notification receives a message indicating that the ASP-related signaling point is unavailable, the content of the state change of the signaling point is ASP-related signaling point having a failure or being unavailable.

17. The signaling gateway according to claim 14, wherein the M3UA signaling point is an ASP-related signaling point, wherein
when the unit for discovering discovers that the ASP-related signaling point has recovered from a failure, or when the unit for receiving a notification receives a message indicating that the ASP-related signaling point is available, the content of the state change of the signaling point is ASP-related signaling point being recovered from a failure or being available.

18. The signaling gateway according to claim 14, wherein the M3UA signaling point is an ASP-related signaling point, wherein
when the unit for discovering discovers that the ASP-related signaling point is congested, or when the unit for receiving a notification receives a message indicating that the ASP-related signaling point is congested, the content of the state change of the signaling point is ASP-related signaling point being congested.

19. The signaling gateway according to claim 14, wherein the M3UA signaling point is an ASP-related signaling point, wherein when the unit for discovering discovers that upper layer service user of the ASP-related signaling point has a failure, or when the unit for receiving a notification receives a message indicating that the upper layer service user of the ASP-related signaling point is unavailable, the content of the state change of the signaling point is ASP-related signaling point upper layer user having a failure or being unavailable.

\* \* \* \* \*